(12) United States Patent
Mcgovern, Jr. et al.

(10) Patent No.: US 9,843,852 B2
(45) Date of Patent: Dec. 12, 2017

(54) SHOCK MOUNTING APPARATUS AND METHOD FOR REDUCING AMOUNT OF SHOCK

(71) Applicant: Shure Acquisition Holdings, Inc., Niles, IL (US)

(72) Inventors: Albert F. Mcgovern, Jr., Naperville, IL (US); John Miller, Niles, IL (US); Daniel Pratt, Niles, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 0 days.

(21) Appl. No.: 15/417,378

(22) Filed: Jan. 27, 2017

(65) Prior Publication Data

US 2017/0155991 A1     Jun. 1, 2017

Related U.S. Application Data

(63) Continuation of application No. 13/448,077, filed on Apr. 16, 2012, now abandoned.

(51) Int. Cl.
*F16M 13/00* (2006.01)
*H04R 1/08* (2006.01)
(Continued)

(52) U.S. Cl.
CPC ............. *H04R 1/08* (2013.01); *F16F 7/14* (2013.01); *F16M 11/06* (2013.01)

(58) Field of Classification Search
CPC .......... H04R 1/08; H04R 1/083; H04R 11/04; H04R 21/021; F16F 7/14; F16M 11/06
(Continued)

(56) References Cited

U.S. PATENT DOCUMENTS 3,870,416 A * 3/1975 Brady .................. B23Q 1/36
                                                108/104
4,194,096 A    3/1980 Ramsey
(Continued)

FOREIGN PATENT DOCUMENTS

DE         1823744 U      12/1960
DE    202005002447 U1      5/2005
(Continued)

OTHER PUBLICATIONS www.amazon.com/Rode-PSM-1-Shockmount-Podcaster/dp/B000WA8KYG.*

(Continued)

*Primary Examiner* — Christopher Garft
(74) *Attorney, Agent, or Firm* — Banner & Witcoff, Ltd.

(57) ABSTRACT

A shock mount for a microphone comprises a first frame member having an upper ring-shaped frame member and a lower ring-shaped frame member. The lower frame member has a microphone mount for receiving a microphone. The shock mount also has a second frame member comprising a ring. The first frame member is suspended from the second member by wire rope or other substantially non-elastic flexible material, and the wire rope is configured to help reduce the amount of vibration encountered by the first frame member. A method comprises providing a first frame member and a second frame member and suspending the first frame member from the second frame member by wire rope or other substantially non-elastic flexible material and mounting a microphone on the first frame member to help reduce the amount of vibration encountered by the first frame member and the microphone.

14 Claims, 11 Drawing Sheets

(51) Int. Cl.
  *F16M 11/06* (2006.01)
  *F16F 7/14* (2006.01)
(58) Field of Classification Search
  USPC .............. 248/610–612, 619–624, 629, 638; 381/368, 361, 363
  See application file for complete search history.

(56) References Cited

U.S. PATENT DOCUMENTS

| | | | |
|---|---|---|---|
| 4,396,807 | A | 8/1983 | Brewer |
| D272,532 | S | 2/1984 | Fitzner et al. |
| 4,453,045 | A | 6/1984 | Bruna |
| D276,043 | S | 10/1984 | Fitzner et al. |
| 4,546,950 | A | 10/1985 | Cech |
| 4,586,689 | A * | 5/1986 | Lantero ............... F16F 7/14 248/570 |
| 4,856,765 | A * | 8/1989 | Kohno ................ A47C 3/20 267/166 |
| 5,455,869 | A | 10/1995 | Miscavige |
| 5,574,236 | A | 11/1996 | Webber |
| D399,166 | S | 10/1998 | Wright |
| 6,459,802 | B1 | 10/2002 | Young |
| D475,995 | S | 6/2003 | Hsieh |
| 6,682,043 | B1 | 1/2004 | Hsieh |
| 6,724,904 | B1 | 4/2004 | Winter |
| 7,760,896 | B2 | 7/2010 | Medveczky |
| D705,761 | S | 5/2014 | McGovern, Jr. et al. |
| D706,245 | S | 6/2014 | McGovern, Jr. et al. |
| 2006/0227991 | A1 | 10/2006 | Klemme |
| 2007/0195983 | A1 | 8/2007 | Klemme |
| 2009/0016558 | A1 * | 1/2009 | Woolf .................. H04R 1/08 381/368 |
| 2010/0239113 | A1 | 9/2010 | Browne |

FOREIGN PATENT DOCUMENTS

| | | |
|---|---|---|
| EP | 423858 A2 | 4/1991 |
| GB | 2388787 A | 11/2003 |
| JP | 56162597 | 12/1981 |
| JP | 2011220440 A | 11/2011 |
| WO | 1994004009 A1 | 2/1994 |
| WO | 2007051925 A1 | 5/2007 |

OTHER PUBLICATIONS

Rode-PSM1 Shock Mount—Unboxing and Review; www.youtube.com/watch?v=i7S59hyXONw.*
Rode PSM1 shock mount unboxing www.youtube.com/watch?v=iGVb3Y0NfNq.*
Design U.S. Appl. No. 29/418,413, "Shock Mount for Microphone", filed Apr. 16, 2012, now issued as D705,761 010886.01466 (7 pages).
Design U.S. Appl. No. 29/418,415, "Shock Mount for Microphone", filed Apr. 16, 2012, now issued as D706,245 010886.01477 (7 pages).
Unknown, "A27SM Elastic Suspension Shock Mount," Shure Online Store, retrieved on Apr. 16, 2012 from ittp://store.shure.com/store/shure/en_US/pd/productID.104211900.
Unknown, "A44ASM Elastic-Suspension Shock Mount," Shure Distribution UK, retrieved on Apr. 16, 2012 from http://www.shure.co.uk/products/accessories/a44asm.
Unknown, "Metal and Mesh Isolators, Cablemount Series," Barry Controls, retrieved on Apr. 16, 2012 from http://www.barrycontrols.com/products/product.cfm?cid=8&fid=39.
Unknown, "Wire Rope Insolators," The VMC Group, retrieved on Apr. 16, 2012 from http://www.thevmcgroup.com/wirerope.html.
Unknown, "Invision Video," Rycote, retrieved on Apr. 16, 2012 from http://www.rycote.com/products/invision_video/.
Unknown, "Custom Shockmount for the Yeti and Yeti Pro Microphones, The Radius," eBuyNow, retrieved on Apr. 16, 2012 from https://bluemic.ebuynow.com/us/ebuynow/microphones-accessories/the-radius.html.
Unknown, "SM2 Microphone Shock Mount," RODE Microphones, retrieved on Apr. 16, 2012 from http://www.rodemic.com/accessories/sm2.
Unknown, "PSM1 Microphone Shock Mount," RODE Microphones, retrieved on Apr. 16, 2012 from http://www.rodemic.com/accessories/psm1.
Unknown, "SM6 Shock Mount with Detachable Pop Filter," RODE Microphones, retrieved on Apr. 16, 2012 from http://www.rodemic.com/accessories/sm6.
Unknown, "SM3 Camera Shoe Shock Mount," RODE Microphones, retrieved on Apr. 16, 2012 from http://www.rodemic.com/accessories/sm3.
Unknown, SM4 Boompole/Mic Stand Shock Mount, RODE Microphones, retrieved on Apr. 16, 2012 from http://www.rodemic.com/accessories/sm4.
Unknown, SM5 Camera Ring-Clamp Shock Mount, RODE Microphones, retrieved on Apr. 16, 2012 from http://www.rodemic.com/accessories/sm5.
Unknown, "Elastic Suspension-EA 1 (mt)," Georg Neumann GmbH, retrieved on Apr. 16, 2012 from http://www.neumann.com/?lang=en&id=current_accessories&cid=db_current_accessories&dbid=6.
Unknown, "Elastic Suspension-EA 170 (mt)," Georg Neumann GmbH, retrieved on Apr. 16, 2012 from http://www.neumann.com/?lang=en&id=current_accessories&cid=db_current_accessories&dbid=16.
Unknown, "Elastic Suspension-EA 2 (mt)," Georg Neumann GmbH, retrieved on Apr. 16, 2012 from http://www.neumann.com/?lang=en&id=current_accessories&cid=db_current_accessories&dbid=147.
Unknown, "Elastic Suspension-EA 30A," Georg Neumann GmbH, retrieved on Apr. 16, 2012 from http://www.neumann.com/?lang=en&id=current_accessories&cid=db_current_accessories&dbid=7.
Unknown, "Elastic Suspension-EA 50," Georg Neumann GmbH, retrieved on Apr. 16, 2012 from http://www.neumann.com/?lang=en&id=current_accessories&cid=db_current_accessories&dbid=12.
Unknown, "Elastic Suspension-EA 87 (mt)," Georg Neumann GmbH, retrieved on Apr. 16, 2012 from http://www.neumann.com/?lang=en&id=current_accessories&cid=db_current_accessories&dbid=14.
Unknown, "Elastic Suspension-EA 89 (mt)," Georg Neumann GmbH, retrieved on Apr. 16, 2012 from http://www.neumann.com/?lang=en&id=current_accessories&cid=db_current_accessories&dbid=15.
Unknown, "Replacement IEC Power Cables," Studio Projects, retrieved on Apr. 16, 2012 from http://www.studioprojectsusa.com/accessories.html.
Unknown, "M600 Universal Microphone Mount," Enhanced Audio, retrieved on Apr. 16, 2012 from http://www.enhancedaudio.ie/m600series.html.
Unknown, "PG3a Pistol Grip," Reinhardt, retrieved on Apr. 16, 2012 from http://www.reinhardt.tv/PG2.php.
Unknown, "Cinela OSIX & MINIX Suspensions Overview," Cinela, retrieved on Apr. 16, 2012 from http://www.cinela.fr/suspensions.php?PHPSESSID=835c44558d92711806210e468e7a3f07.
Unknown, "Current Microphones," Georg Neumann, retrieved on Apr. 16, 2012 from http://www.neumann.com/?id=current_microphones&lang=en.
Unknown, "SM01 Shockmount 1.73 to 1.89\Diamter," retrieved on Apr. 16, 2012 from http://www.woodbrass.com/en/product_info.php?products_id=34954&af=35.
Cutchins, Cochran, Jr., Kumar, Fitz-Coy and Tinker, "Initial Investigations into the Damping Characteristics of Wire Rope Vibration Isolators," Aerospace Engineering Department Auburn University, Alabama, Jan. 1987, 88 pages.
Roel Leenen, "The Modelling and Identification of an Hysteretic System," Department of Mechanical Engineering, Eindhoven University of Technology, Dec. 2002, 45 pages.
Gary C. Foss, "Modal Damping Estimates from Static Load- (56) References Cited

OTHER PUBLICATIONS

Deflection Curves," Structural Dynamics Laboratory, Boeing Commercial Airplane Group, 8 pages.

* cited by examiner

SHOCK MOUNTING APPARATUS AND METHOD FOR REDUCING AMOUNT OF SHOCK

RELATED APPLICATIONS

This Application is a continuation of U.S. application Ser. No. 13/448,077 filed on Apr. 16, 2012, which is fully incorporated by reference herein.

FIELD

This disclosure generally relates to a shock-mounting apparatus designed for supporting a microphone to isolate the microphone from surrounding environmental vibration and a method for reducing the amount of shock encountered by a microphone.

BACKGROUND

Microphones, such as condenser, ribbon, or dynamic type among others, with vastly improved sensitivity and response characteristics are continually being developed by the audio industry. Microphones can include a transducer, which picks up the sound from any source, such as a voice or instrument. However, with highly sensitive transducers, a very small stimulus can move the low mass transducer diaphragm. While this leads to higher audio quality, microphones can be highly sensitive to vibration, and unwanted vibrations can produce audible noise. Microphones generally are most sensitive to vibration along the axis of the diaphragm. Under these circumstances, motion of the microphone body that results in motion of the transducer diaphragm can generate an unwanted electrical output and noise.

In certain instances, isolation of microphones from mechanical vibration is essential to their best use. One such example of a microphone shock mounting apparatus is U.S. Pat. No. 4,514,598 to Plice. U.S. Pat. No. 4,514,598 discloses the use of a rubber material for isolating the mechanical vibrations encountered by the microphone. Although elastomeric materials can be used in conjunction with the embodiments described herein, elastomeric materials tend to wear out over time and have to be replaced often.

Microphones may include internal damping mechanisms or external, shock-mounting apparatuses. One advantage of an external shock-mounting apparatus is compatibility with various types of microphones without the change of the internal microphone structure. However, the concepts and techniques disclosed herein could be adapted for use with an internal microphone structure.

BRIEF SUMMARY

In an exemplary embodiment, a shock mount for use with a microphone is disclosed. The shock mount comprises a first frame member configured to receive the microphone; a second frame member configured to receive a mounting apparatus; and a plurality of non-elastic flexible members interconnecting the first frame member and second frame member. The first frame member is also suspended from the second frame member by the flexible members.

In another exemplary embodiment, a method for reducing shock to a microphone is disclosed. The method comprises providing a first frame member and a second frame member and suspending the first frame member from the second frame member by a plurality of non-elastic flexible members.

In another exemplary embodiment, a shock mount is disclosed having a first frame member comprising an upper ring-shaped frame member and a lower ring-shaped frame member. The first frame member is configured to receive a microphone. The shock mount has a second frame member comprising a ring, which is configured to receive a mounting apparatus. A non-elastic flexible member interconnects the first frame member and the second frame member. The flexible member is configured to help reduce the amount of vibration encountered by the first frame member relative to a subsonic and an audible frequency range.

It will be appreciated by those skilled in the art, given the benefit of the following description of certain exemplary embodiments disclosed herein, that at least some of these embodiments have improved or alternative configurations suitable to provide enhanced benefits. These and other aspects, features and advantages of this disclosure or of certain embodiments of the disclosure will be further understood by those skilled in the art from the following description of exemplary embodiments taken in conjunction with the following drawings.

BRIEF DESCRIPTION OF THE DRAWINGS

To understand the present disclosure, it will now be described by way of example, with reference to the accompanying drawings.

DETAILED DESCRIPTION OF CERTAIN EXEMPLARY EMBODIMENTS

While this disclosure is susceptible of embodiments in many different forms, there are shown in the drawings and will herein be described in detail exemplary embodiments with the understanding that the present disclosure is to be considered as an exemplification of the principles of the invention and is not intended to limit the broad aspect of the invention to the embodiments illustrated.

Figure 9:
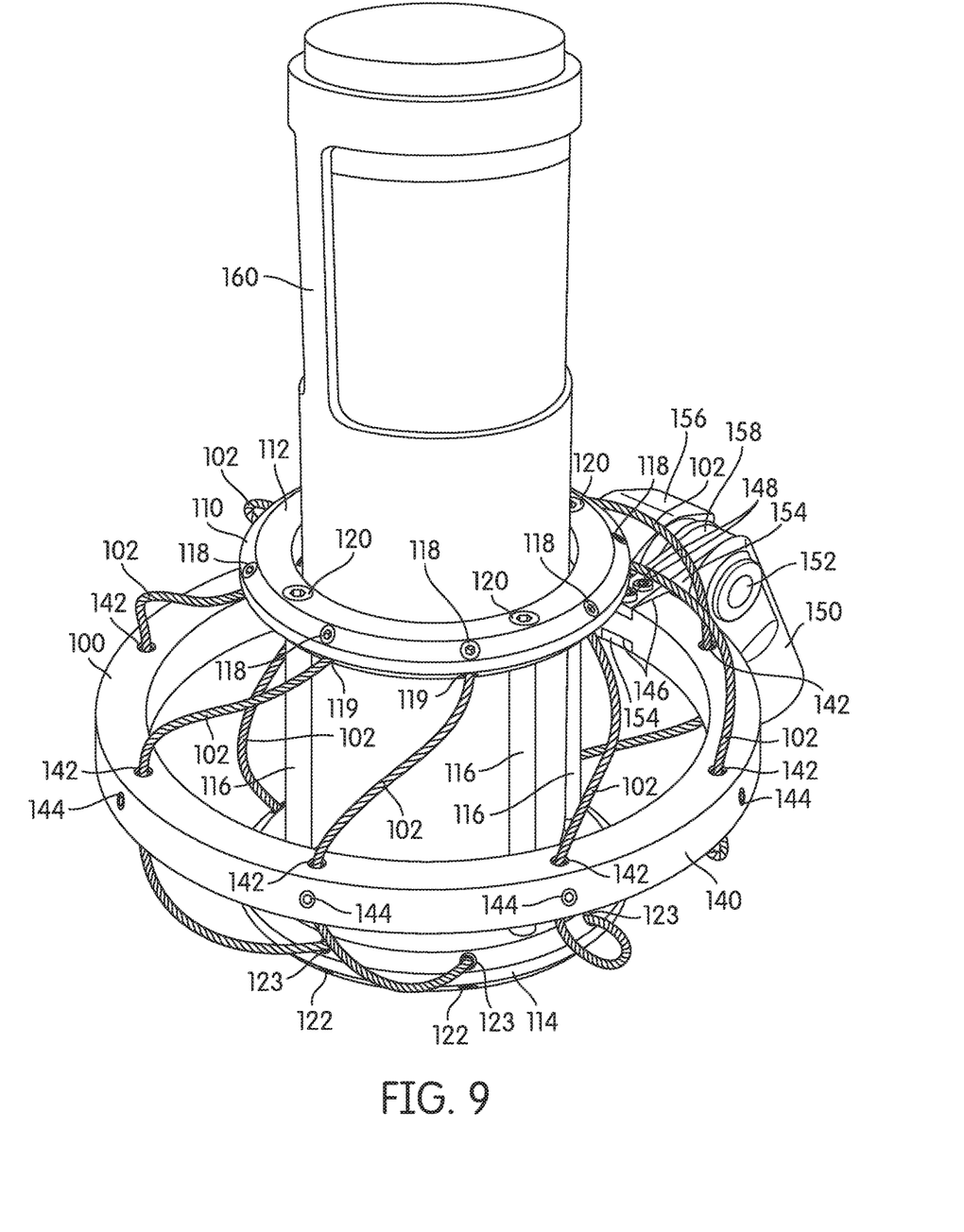
FIG. 9 shows another perspective view of the shock mount of FIG. 1 housing a microphone.

FIGS. 1-9 show a first exemplary embodiment of the shock mount 100. The shock mount 100 comprises a first inner frame member 110 and a second outer frame member 140. The first frame member 110 is coupled to and suspended from the second frame member 140 by a series of wire ropes 102, which are configured to help reduce the amount of vibration encountered by the first frame member 110. As shown in FIG. 9, the first frame member 110 is configured to receive a microphone 160 in the center of the first frame member 110. The second frame 140 can be provided with a mounting apparatus 150, which is configured to swivel for mounting the shock mount 100 to a microphone stand, boom, etc.

The first frame member 110 comprises an upper frame member 112 and a lower frame member 114. The upper frame member 112 and the lower frame member 114 can be connected together using a series of posts or columns 116, which in this embodiment can be four. However, different numbers of posts or columns 116 and different arrangements for connecting the upper frame member 112 to the lower frame member 114 are also contemplated. It is also contemplated that the first frame member 110 can be made as a single part, for example, the first frame member 110 can be machined from a solid piece of material to form one component such that the upper frame member 112, lower frame member 114, and columns 116 are integral. A felt-like or other protective material can be provided on the first frame member 110, for example on the interior circumference of the first frame member 110, to prevent the shock mount 100 from scratching the microphone 160 when the microphone 160 is inserted into or removed from the shock mount 100.

The upper frame member 112 can be formed in the shape of a ring. The upper frame member 112 can be formed with a first series of holes 119 for receiving the wire rope 102, and a second series of holes 118 for receiving a set screw for securing the wire rope to the upper frame member. A third series of holes 120 can also be provided for receiving the posts or columns 116 and respective screws or bolts for securing the posts 116 to the upper frame member 112. One end of each wire rope 102 is secured to the upper frame member 112. In an exemplary embodiment, the wire rope 102 ends are secured to the upper frame member 112 by a series of set screws and glue. However, other known methods in the art are also contemplated for securing the wire rope 102 and the posts 116 to the upper frame member 112, such as welding, other forms of threaded fasteners, glue, or combinations thereof.

Figure 1:
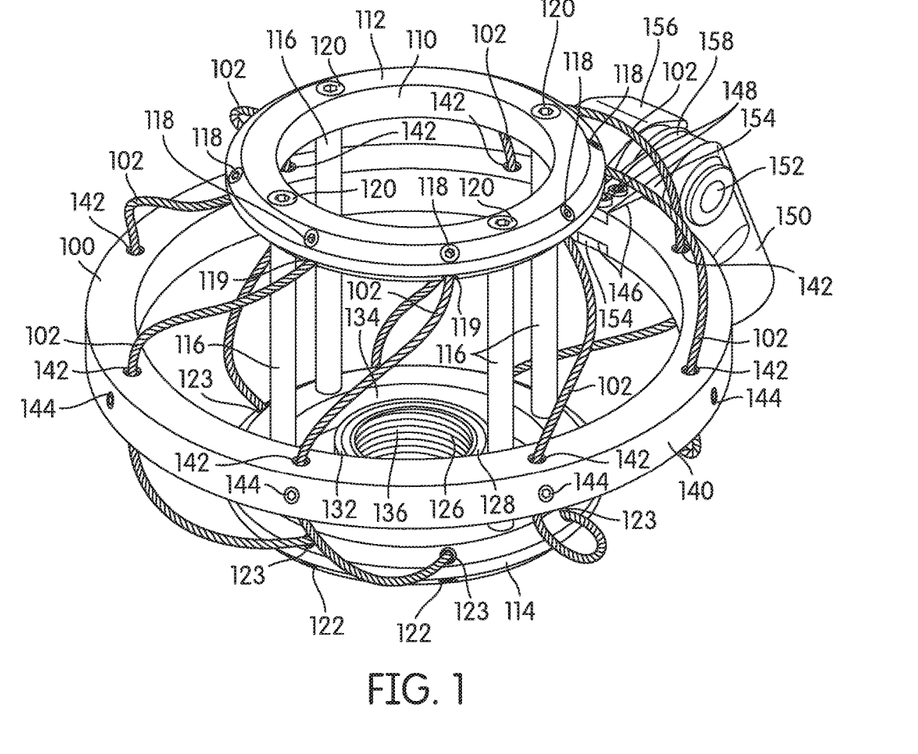
FIG. 1 shows a top perspective view of a shock mount in accordance with an exemplary embodiment.
Figure 2:
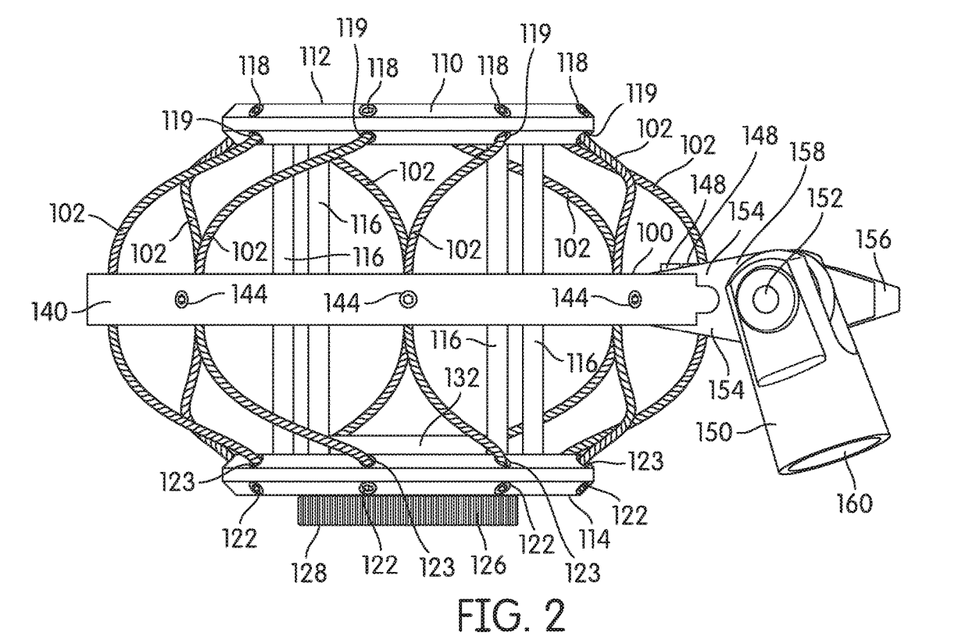
FIG. 2 shows a right side view of the exemplary embodiment of FIG. 1.
Figure 3:
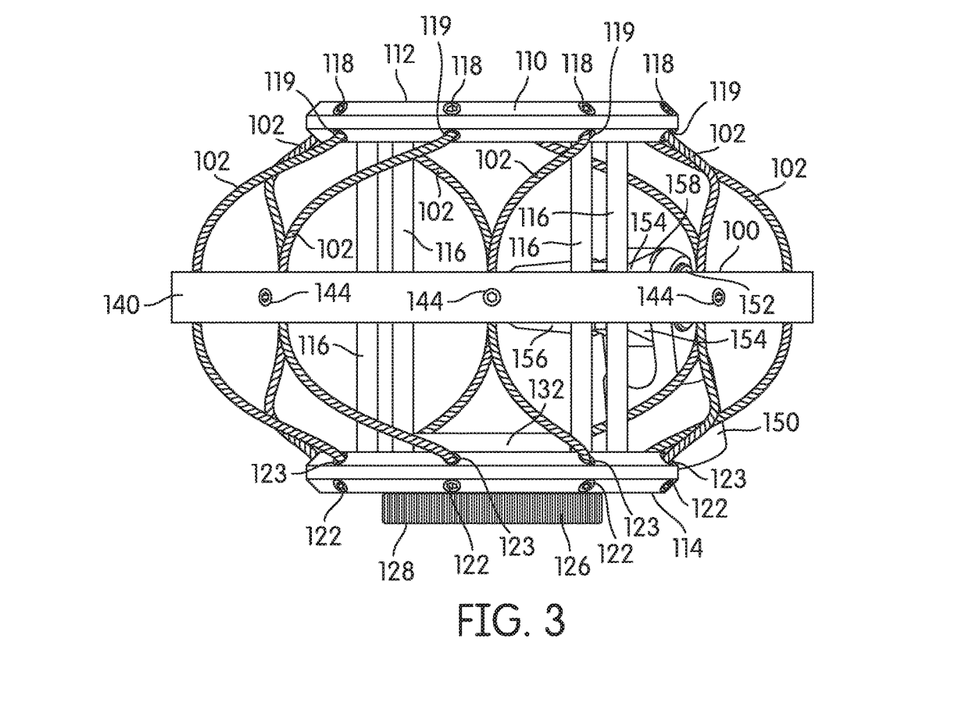
FIG. 3 shows a front view of the exemplary embodiment of FIG. 1.
Figure 4:
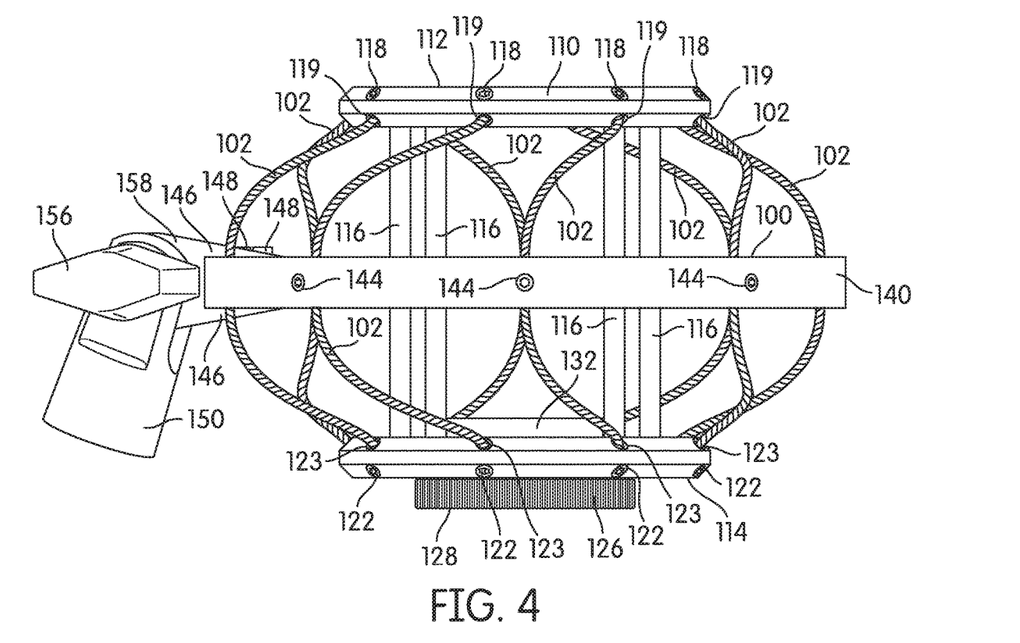
FIG. 4 shows a left side view of the exemplary embodiment of FIG. 1.
Figure 5:
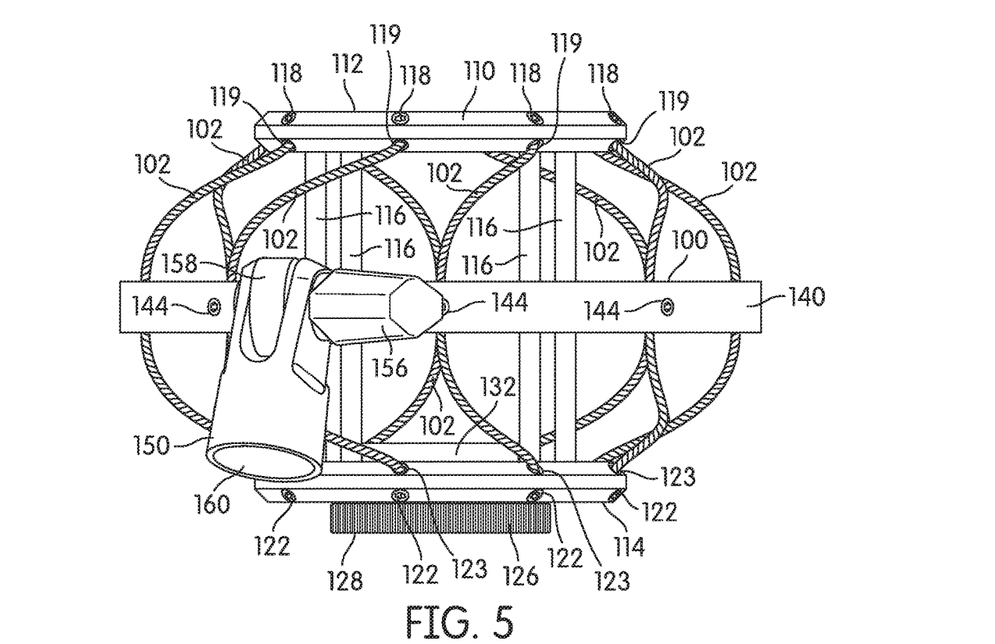
FIG. 5 shows a rear view of the exemplary embodiment of FIG. 1.
Figure 6:
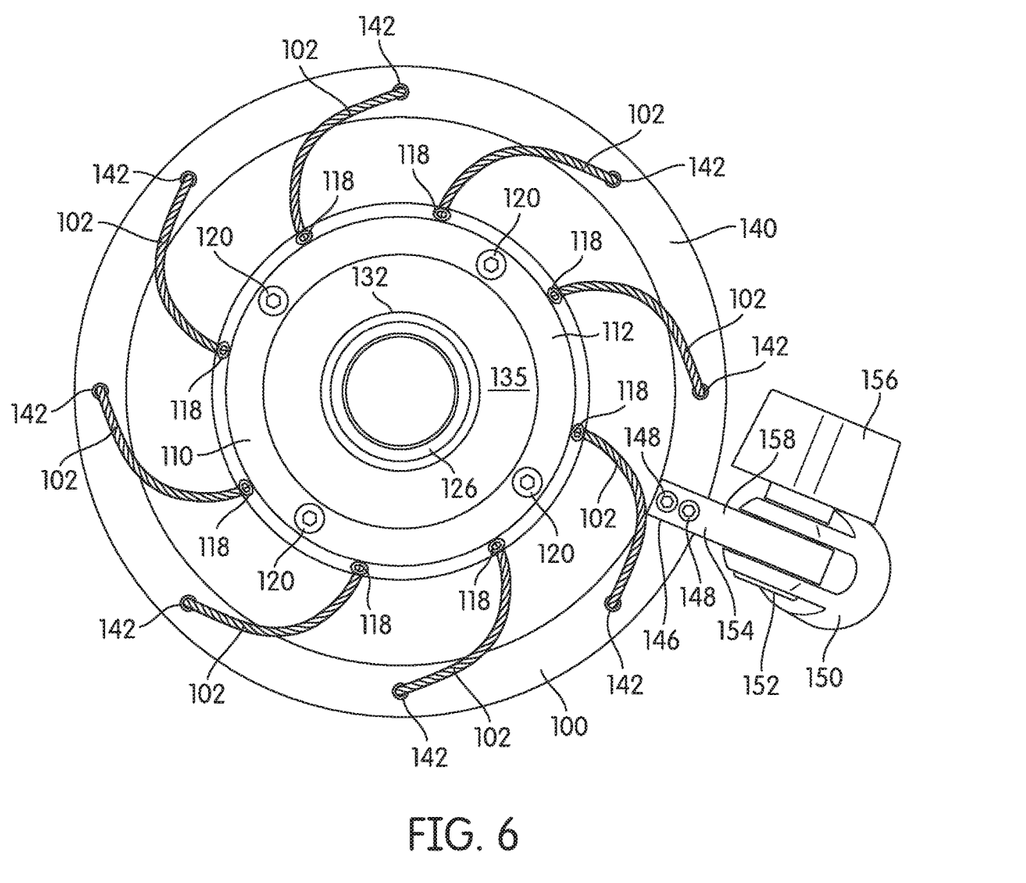
FIG. 6 shows a top view of the exemplary embodiment of FIG. 1.

The lower frame member 114 can also be formed in the shape of a ring and may include an optional collar 132 for securing the microphone 160. The ring can be formed with a rim 134, which forms an inner edge surrounding an outer circumference of the microphone 160. As shown in FIGS. 1 and 6, the rim 134 and the collar 132 define a channel 135 (as shown in FIG. 6) for mounting the microphone 160. The lower frame member 114 can also be formed with a first series of holes 123 for receiving the wire rope 102 and a second series of holes 122 for receiving set screws to secure the wire rope 102 to the lower frame member 114. A third series of holes 124 can be provided for receiving the posts or columns 116 and screws or bolts for securing the posts to the lower frame member 114. Like with the upper frame member 112, the wire rope 102 ends are secured to the lower frame member 114. In an embodiment, the wire rope 102 ends are secured to the lower frame member 114 by a series of set screws and glue. However, again, other known methods in the art are also contemplated for securing the wire rope 102 and the posts 116 to the lower frame member 114, such as welding, other types of threaded fasteners, glue, or combinations thereof.

The collar 132 in the lower frame member 114 can be provided with a microphone mount 126 for securing the microphone 160 to the shock mount 100. The microphone mount 126 can be in the form of a threaded nut 128. The threaded nut 128 can be provided with a hole 130, and the nut 128 may further include internal threads 136 that correspondingly engage threads on the base of the microphone 160 for easy coupling and removal of the microphone 160 from the shock mount 100. As depicted in FIGS. 2-5 and FIG. 8, the exterior surface of the threaded nut 128 can be formed with a series of ridges for the user to grip the threaded nut 128 so as to permit the user to easily mount the microphone 160 in the shock mount 100 or to easily remove the microphone 160 from the shock mount 100.

The second frame member 140 can be in the shape of a ring, which in an embodiment, is larger in diameter than the rings forming the upper and lower frame members 112, 114 of the first frame member 110. The ring can be provided with a series of through holes 142 (passing through the thickness of the second frame member 140) for receiving wire rope and a second series of holes 144 for receiving threaded fasteners. The threaded fasteners act as set screws to secure the wire rope 102 and prevent movement of the wire rope 102 through the holes 142 and relative to the second frame member 140. Again, other known methods in the art are also contemplated for securing the wire rope 102 to the second frame member, such as welding, other types of threaded fasteners, glue, or combinations thereof. The second frame member 140 can also be configured to receive the mounting apparatus 150 for mounting the shock mount to a boom, microphone stand, or other structure holding the shock mount 100.

In an exemplary embodiment, the mounting apparatus 150 has a pivot adjustment mechanism 152 and a connecting arm 158 having two extensions or flanges 154. The pivot adjustment mechanism 152 can be provided with a wing nut 156. The extensions 154 of the connecting arm 158 are received by the second frame member 140 by two notches 146 and are secured to the second frame member 140 by two threaded fasteners 148. Other known methods of securing the second frame member 140 to a microphone stand are contemplated. Additionally, the pivot adjustment mechanism 152 can adjust the angle of the shock mount 100 relative to the microphone stand (not shown). The pivot adjustment mechanism 152 can also provide a joint or connection between the mounting apparatus 150 and the connecting arm 158. The mounting apparatus 150 can be provided with a threaded portion 160 for receiving a threaded stud (not shown) on a microphone stand (not shown).

In the exemplary embodiment shown in FIGS. 1-9, the first frame member 110 can be suspended by and interconnected to the second frame member 140 by a plurality of wire ropes 102. Each of the plurality of wire ropes 102 has a first end and a second end. Each first end of the wire ropes 102 is connected and fixed to the upper frame member 112 and each second end is connected and fixed to the lower frame member 114. A middle portion of the wire ropes 102 are fixed to the second frame member 140. However, the first frame member can be suspended by any non-elastic flexible member including twisted rope, non-twisted rope, or unitary materials. The flexible suspension material can be formed of any metal, alloy, composite, or high strength polymer.

The wire rope comprises a plurality of wires twisted together, which as discussed below provides good energy absorption. The wire rope provides tensile strength, but does not provide compressive strength. In other words, the wire rope is rigid and does not stretch in one direction axially. However, the wire ropes are spring like and they can be arranged such that they can flex or bend and will return to their original shape as positioned on the shock mount.

Each wire rope 102 can be of the following construction. Overall wire rope diameter of 1/16 in, constructed using seven strands with a length of lay between 0.375 and 0.500 in., and each strand can have seven wires of 0.007 in diameter and can be made of stainless steel. The number of wire ropes 102 joining the first frame member 110 to the second frame member 140 can be eight. However, more or less wire ropes and different diameter wire rope formed of different strand constructions, as well as other wire material and damping material are contemplated for achieving the desired damping or shock absorption. For example, a wire rope constructed of seven strands, each with 19 wires, can be used, and the first frame member 110 can be suspended from the second frame member 140 by as little as two wire ropes.

Figure 7:
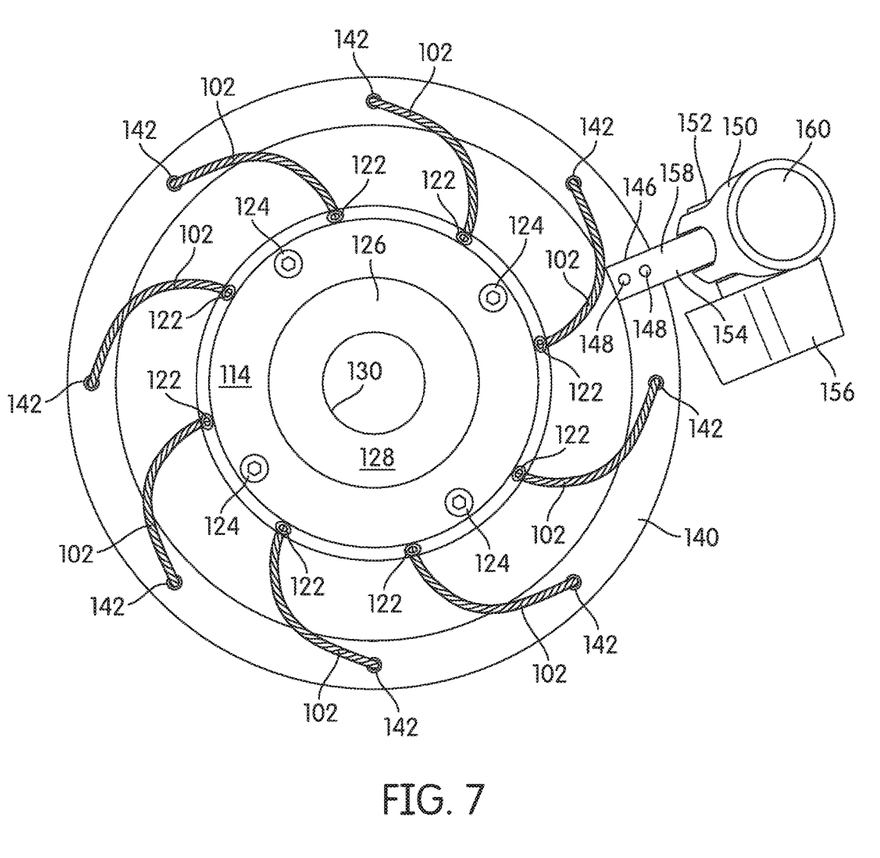
FIG. 7 shows a bottom view of the exemplary embodiment of FIG. 1.
Figure 8:
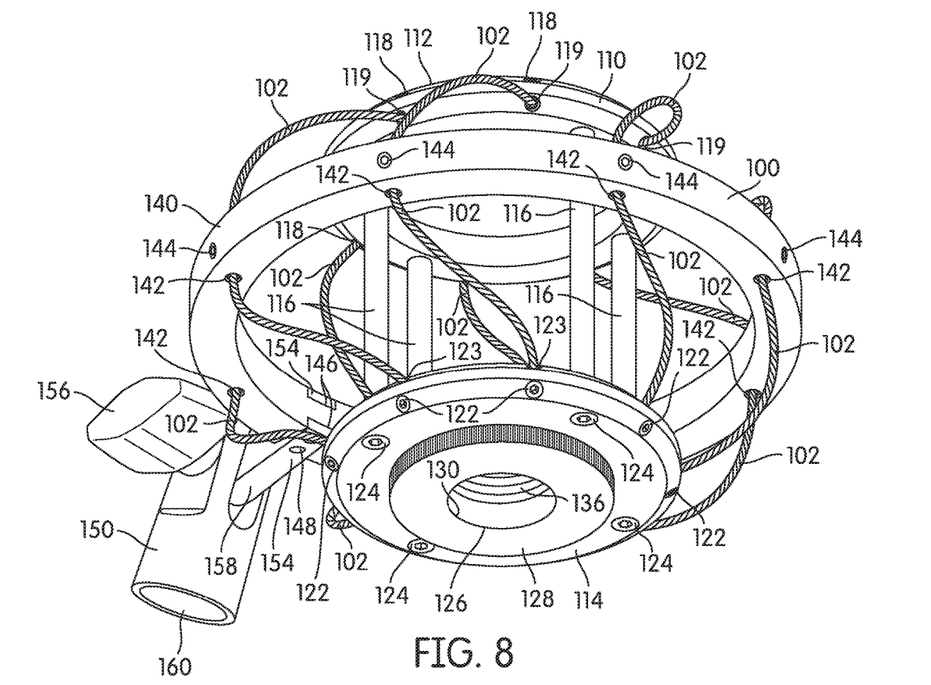
FIG. 8 shows a bottom perspective view of the shock mount of FIG. 1.

The wire ropes 102 are fixed to the upper frame member 112 of the first frame member 110, and then are located and fixed in holes 142 of the second frame member 140. The ends of the wire rope 102 are then secured in the lower frame member 114 of the first frame member 110. The wire ropes 102 can be oriented so as to be curved from the upper frame member 112 to the second frame member 140 and curved from the second frame member 140 to the lower frame member 114. This provides for a degree of compliance or slack in the wire rope, which gives the desired damping of shock encountered by the microphone. As an example of how the wire ropes 102 may be curved, the wire ropes 102 can be oriented so as to extend in a helical pattern/pathway from the upper frame member 112 to the second frame member 140 and in a helical pattern/pathway from the second frame member 140 to the lower frame member 114, as shown in FIGS. 6 and 7. In some embodiments, such as the embodiment shown in FIG. 2, the curving of wire ropes 102 from the upper frame member 112 to the second frame member 140 and from the second frame member 140 to the lower frame member 114 may result in a parabolic arrangement of the wire ropes 102. It is also contemplated that the wire ropes can be arranged in a straight formation between the first frame member 110 and the second frame member 140.

By suspending the first frame member 110 from the second frame member 140 with wire rope 102, the microphone 160 mounted in the first frame member 110 is substantially isolated from vibrations encountered by the microphone stand, boom, or other supporting mechanism coupled to the second frame member 140. The use of wire rope 102 in a shock mount for a microphone non-intuitively provides good energy absorption. Traditionally, elastomers are used to provide the desired damping in shock mounts because rubber is soft and can provide the right damping properties for a particular microphone. Although wire rope has inherently stiff mechanical properties, the inventors have discovered that wire rope can be configured to provide the desired damping characteristics for a microphone.

Using wire rope in a shock mount for a microphone provides good energy absorption, or attenuation, in all directions through a combination of several mechanisms, some or all of which are present depending upon the situation. These mechanisms include the displacement of each wire rope relative to one another, the displacement of the wires in each strand relative to one another, and the transfer of mechanical energy to heat via friction of the stands and wires. In particular, mechanical energy can be dissipated through the wire rope by the action of untwisting and twisting the strands of the wire rope, which occurs during use of the mount. Also the friction created when the strands of the wire rope are rubbed against one another dissipates mechanical energy through heat. This is desired because vibration and shock energy are multidirectional, and absorption and attenuation in all axes is a desired feature of a properly functioning shock mount.

Use of wire rope also provides a rugged, durable, and long lasting mount. As discussed above, the wires of the wire rope dissipate heat through friction between the wires. The dissipation of heat through the wires does not adversely affect the properties of the wires on the molecular level, which prolongs the life of the wire ropes and the mount. Contrastingly, elastomeric materials have a limited life because heat dissipation molecularly affects an elastomeric material, which leads to a shorter life. Additionally, the usual implementation of elastomeric materials is prone to accidental loosening and separation of the elastomeric mounting members from their mechanical mounts. This is a deficiency with elastomeric mounts for microphones. The robust and reliable method used to attach the wire ropes to their mounting members prevents accidental loosening or separation of the mount during use. Moreover, as discussed above, the wire rope is rigid in one direction axially and provides damping by flexing. Whereas, typical elastomeric materials stretch in an axial direction to provide the desired damping.

Additional differences exist between wire rope and the elastomeric material traditionally used for mounts. Elastomeric materials, when undergoing a force with both ends rigidly fixed, will stretch instantly and, providing the displacement is within the elastic range of the material's Young's Modulus, will quickly return to the original shape after the force is removed. Shock mount members made from elastomeric materials can stretch over 5 times their original length, depending on the particular material being used and the shape of the shock mount member, and still return to their original shape when the force is removed. The metallic materials typically used for wire rope, when subjected to the same force, will infinitesimally stretch because their Young's modulus is 1800 to 18000 times higher than that of the elastomeric material. These materials are very stiff (substantially non-elastic); thus, they rely on the aforementioned friction and relative motion between the individual wire strands in the wire ropes to provide their shock mounting capability. Elastomeric and other plastic materials typically used for shock mounts have a low Young's Modulus (also known as Modulus of Elasticity), between 0.01 and 3 GPa, whereas metallic materials used for wire ropes have a Young's Modulus of elasticity between 150 and 180 GPa.

The arrangement of the first frame member 110 and the second frame member 140 can be adjusted depending on the particular microphone used and the amount of damping required. Therefore, it is contemplated that using more or less wire ropes and using different diameter cable and/or wires depending on the diameter selected can be used to provide the desired shock mount resonant frequency and damping characteristics. For example, the resonant frequency can be raised by using shorter wire ropes with the same wire gauge and construction or by using larger diameter wires in the same length of rope. Other types of resilient members are contemplated to be used in conjunction with the frames, and fall into two categories: metallic (e.g., steel or brass wires in the strands) and non-metallic (e.g., solid elastomeric or thermoplastic elastomer isolation members).

The embodiments disclosed herein can be configured to provide a certain vibration and shock isolation performance relative to the critical subsonic (below 20 Hz) and audible (20 Hz to 20 KHz) frequency ranges, such that they do not produce undesirable artifacts in the microphone.

Figure 10:
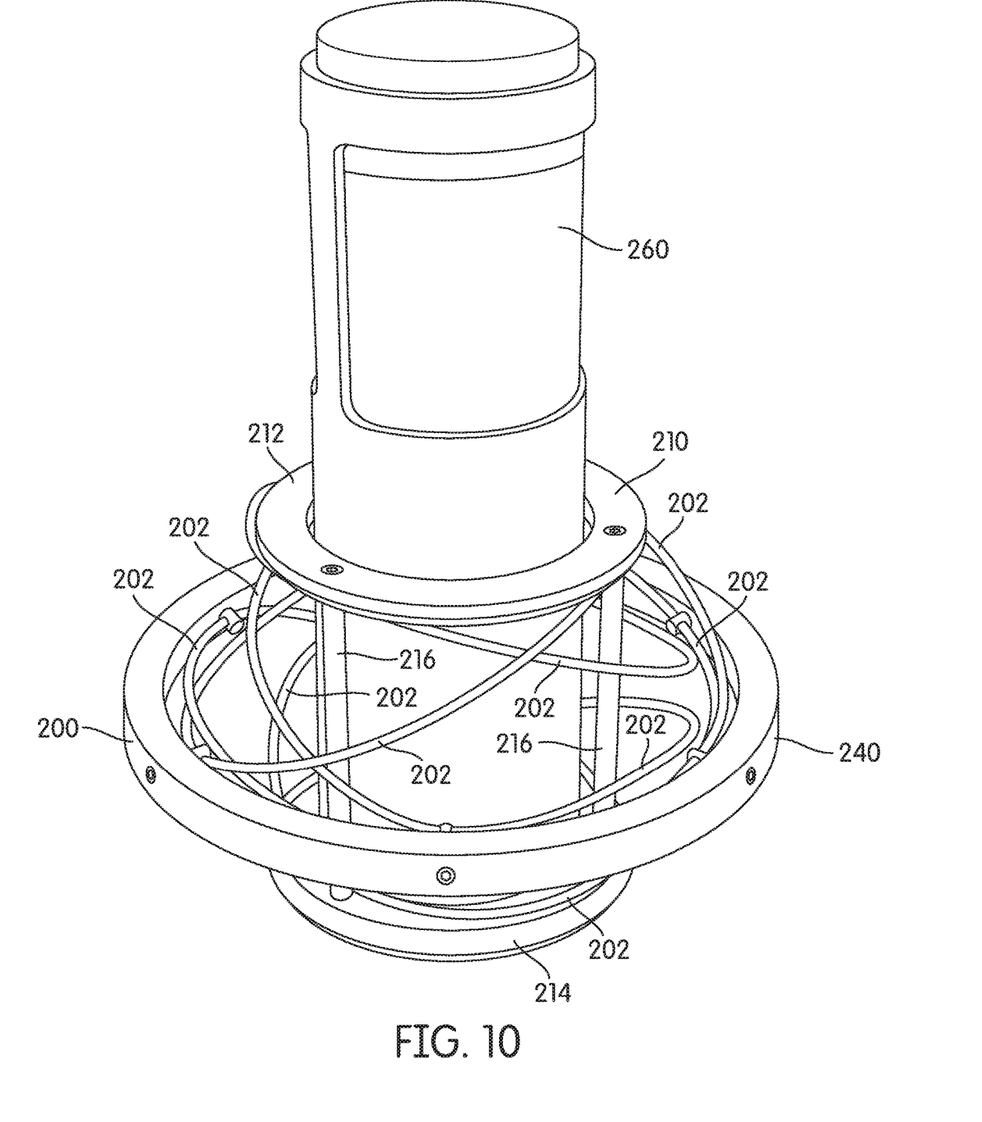
FIG. 10 shows a perspective view of another exemplary embodiment.
Figure 11:
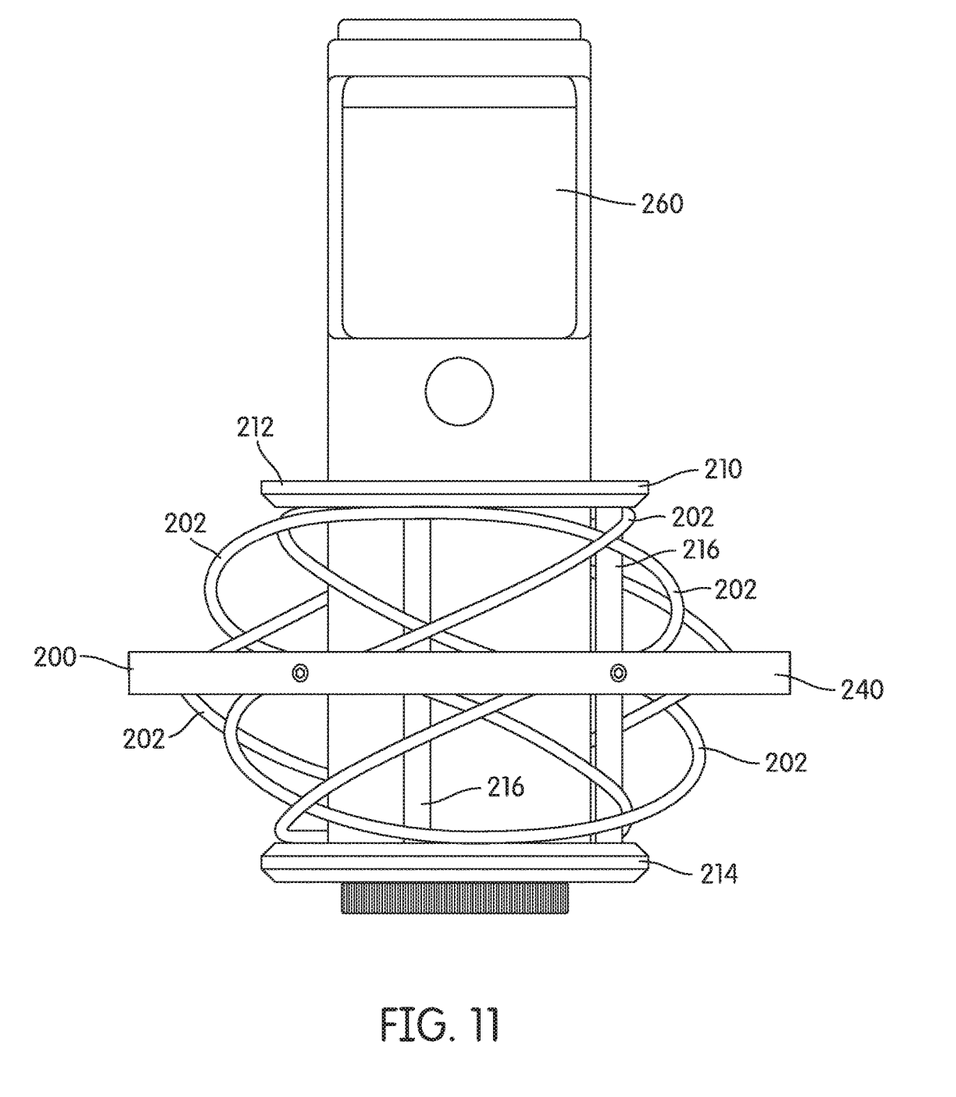
FIG. 11 shows a front view of the exemplary embodiment of FIG. 10.

Other arrangements of the shock mount are contemplated. For example, FIGS. 10 and 11 show an alternative embodiment, where the wire ropes 202 are arranged in an overlapping or crisscross fashion. This embodiment can be arranged similar to the embodiment disclosed in FIGS. 1-9, where like reference numerals represent like components. The shock mount 200 has a first frame member 210 suspended from a second frame member 240 by a series of wire ropes 202, which are configured to help reduce the amount of vibration encountered by the first frame member 210 in a similar manner to the embodiment shown in FIGS. 1-9. As shown in FIG. 10, the first frame member 210 is configured to receive a microphone 260 in the center of the first frame member 210. The second frame 240 can be provided with a mounting apparatus (not shown) for mounting the shock mount 200 to a microphone stand, boom, etc.

The first frame member 210 can also have an upper frame member 212 and a lower frame member 214. The upper frame member 212 and the lower frame member 214 can be fixed together using a series of posts or columns 216, which in this embodiment can also be four.

The wire rope 202 can be arranged in an overlapping or crisscross configuration to provide a certain appearance consistent with a particular theme. The crisscross configuration can deliver vibration or shock isolation functionality similar to the embodiment disclosed in FIGS. 1-9. In this embodiment the wires 202 can be configured to cross one another adjacent to the frame members 210, 240.

Figure 12:
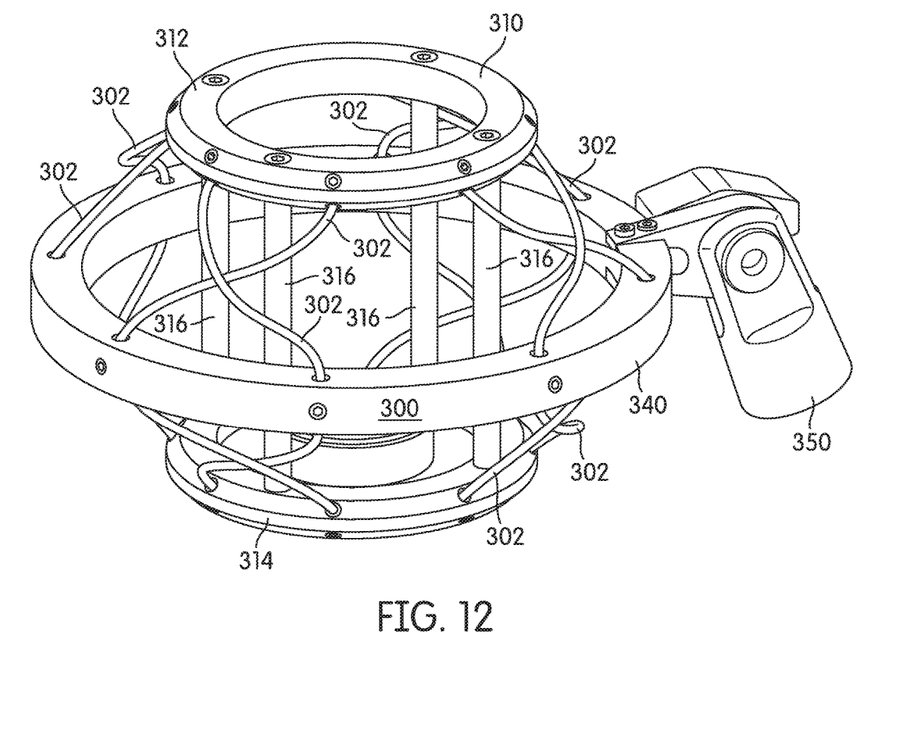
FIG. 12 shows a perspective view of another exemplary embodiment.
Figure 13:
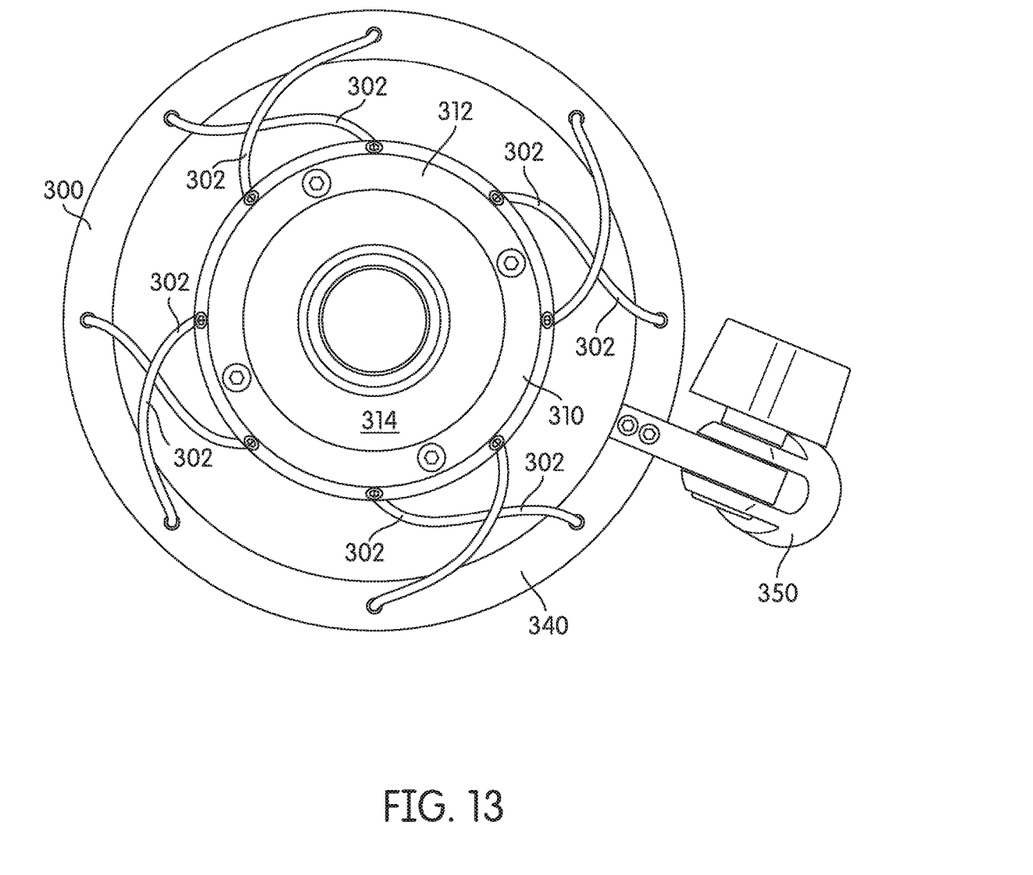
FIG. 13 shows a top view of the exemplary embodiment of FIG. 12.

FIGS. 12 and 13 show yet another alternative embodiment, where the wire ropes 302 are arranged to cross over one another. This embodiment can be arranged similar to the embodiment disclosed in FIGS. 1-9, where like reference numerals represent like components. The shock mount 300 has a first frame member 310 suspended from a second frame member 340 by a series of wire ropes 302, which are configured to help reduce the amount of vibration encountered by the first frame member 310 in a similar manner to the embodiment shown in FIGS. 1-9. As shown in FIGS. 12 and 13, the first frame member 310 is configured to receive a microphone (not shown) in the center of the first frame member 310. The second frame 340 can be provided with a mounting apparatus 350, having the same components and function as described above with respect to the embodiment shown in FIGS. 1-9, for mounting the shock mount 300 to a microphone stand, boom, etc.

The first frame member 310 can also have an upper frame member 312 and a lower frame member 314. The upper frame member 312 and the lower frame member 314 can be fixed together using a series of posts or columns 316, which in this embodiment can also be four. In this embodiment the wire ropes 302 can be configured to cross one another at a location between the frame members.

Given the benefit of the above disclosure and description of exemplary embodiments, it will be apparent to those skilled in the art that numerous alternative and different embodiments are possible in keeping with the general principles of the invention disclosed here. Those skilled in this art will recognize that all such various modifications and alternative embodiments are within the true scope and spirit of the invention. The appended claims are intended to cover all such modifications and alternative embodiments. It should be understood that the use of a singular indefinite or definite article (e.g., "a," "an," "the," etc.) in this disclosure and in the following claims follows the traditional approach in patents of meaning "at least one" unless in a particular instance it is clear from context that the term is intended in that particular instance to mean specifically one and only one. Likewise, the term "comprising" is open ended, not excluding additional items, features, components, etc.

What is claimed is:

1. A shock mount apparatus for supporting a microphone comprising:
    a first frame member configured to receive the microphone, the first frame member comprising an upper frame member and a lower frame member, the upper frame member and the lower frame member being connected together using a plurality of entirely straight columns extending between the upper frame member and the lower frame member;
    a second frame member configured to receive a mounting apparatus; and
    a plurality of members interconnecting the first frame member and the second frame member, the plurality of members being substantially non-elastic in an axial direction,
    wherein the first frame member is suspended from the second frame member by the plurality of members, wherein the plurality of members are configured to provide damping of the first frame member relative to the second frame member by flexing, and wherein the plurality of members extend from the first frame member to the second frame member in a helical pattern.

2. The shock mount of claim 1 wherein both the first frame member and the second frame member each have a plurality of holes for receiving the members.

3. The shock mount of claim 2 wherein a first end of each of the members are fixed to the first frame member and wherein each of the members pass through one of a plurality of holes in the second frame member.

4. The shock mount of claim 1 wherein each of the members are fixed to the upper frame member at a first end and the lower frame member at a second end, and wherein the members are fixed to the second frame member at a middle portion of the members.

5. The shock mount of claim 1 wherein the lower frame member and the upper frame member are rigidly connected to one another.

6. The shock mount of claim 1 wherein the lower frame member is ring-shaped and the upper frame member is ring-shaped.

7. The shock mount of claim 1 wherein the first frame member further comprises a microphone mount.

8. The shock mount of claim 1 wherein the members are configured to help reduce the amount of vibration encountered by the first frame member relative to a subsonic and an audible frequency range.

9. The shock mount of claim 1 wherein the members are formed of a metal.

10. The shock mount of claim 9 wherein the members each comprise a plurality of twisted wires.

11. A shock mount apparatus for supporting a microphone comprising: a first frame member configured to receive the microphone, the first frame member comprising an upper frame member and a lower frame member; a second frame member configured to receive a mounting apparatus; and a plurality of members interconnecting the first frame member and the second frame member, the plurality of members being substantially non-elastic in an axial direction, wherein the first frame member is suspended from the second frame member by the plurality of members, wherein the plurality of members are configured to provide damping of the first frame member relative to the second frame member by flexing, wherein the plurality of members extend in a parabolic arrangement from the upper frame member to the second frame member and from the second frame member to the lower frame member, and wherein a connection of at least one of the plurality of members with the upper frame member is radially offset from a connection of the at least one of the plurality of members with the second frame member.

12. The shock mount apparatus of claim 1 wherein the lower frame member comprises a collar and a rim that define a channel.

13. The shock mount apparatus of claim 11 wherein the at least one of the plurality of members extends from a first hole on the upper frame member to a second hole on the second frame member to a third hole on the lower frame member, wherein the second hole axis plane is not aligned with a first hole axis plane and the second hole axis plane is not aligned with the third hole axis plane, and wherein the third hole axis plane intersects with the first hole axis plane in a vertical direction.

14. The shock mount apparatus of claim 11 wherein the connection of the at least one of the plurality of members with the second frame member defines a vertex of the parabolic arrangement.

* * * * *